April 9, 1935.  J. L. ADAMS, JR  1,997,272
METHOD AND APPARATUS FOR MAKING WELDED ARTICLES
Filed Aug. 22, 1931  3 Sheets-Sheet 1
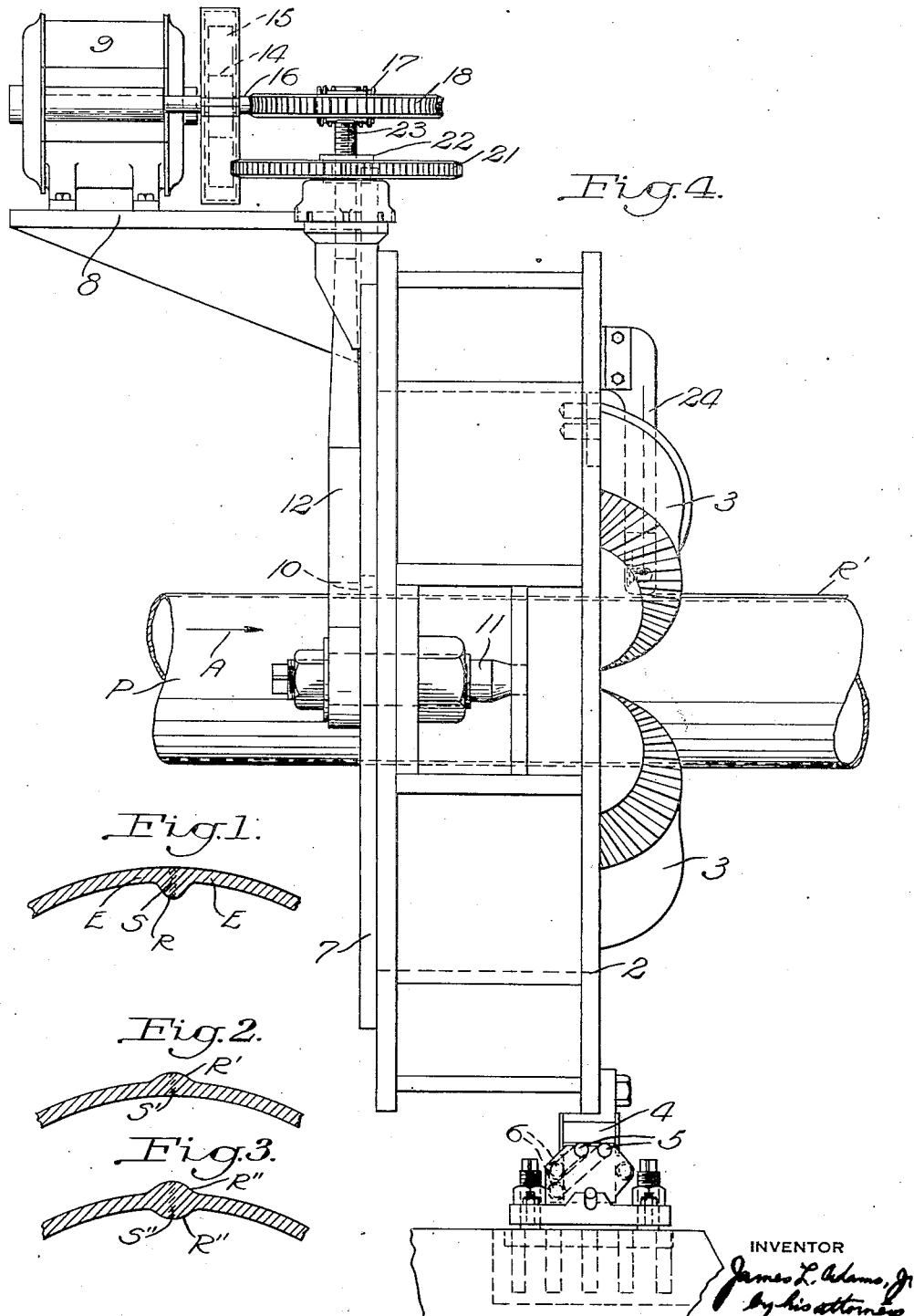

April 9, 1935.  J. L. ADAMS, JR  1,997,272
METHOD AND APPARATUS FOR MAKING WELDED ARTICLES
Filed Aug. 22, 1931  3 Sheets-Sheet 2

INVENTOR
James L. Adams Jr
by his attorney

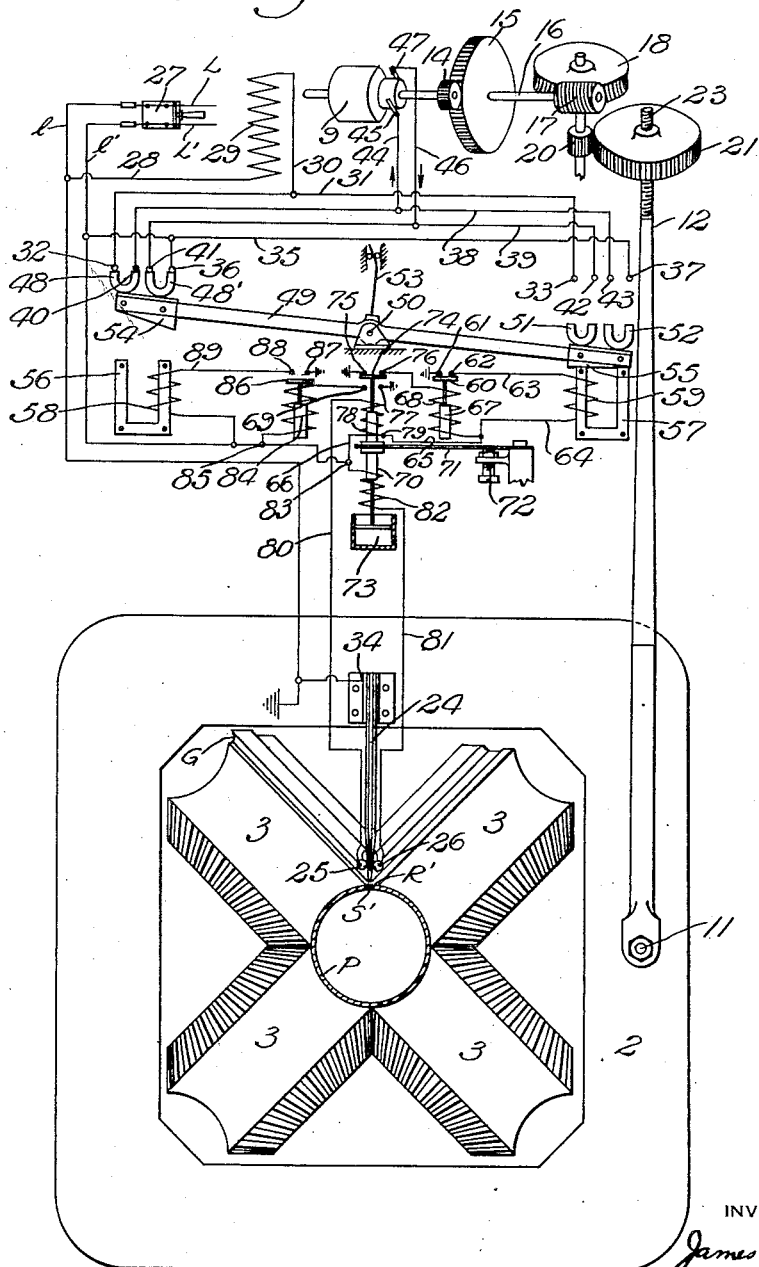

Patented Apr. 9, 1935

1,997,272

UNITED STATES PATENT OFFICE 1,997,272

METHOD AND APPARATUS FOR MAKING WELDED ARTICLES

James L. Adams, Jr., Youngstown, Ohio, assignor, by mesne assignments, to Direct Current Welding Company, a corporation of Delaware Application August 22, 1931, Serial No. 558,715

21 Claims. (Cl. 219—6)

The present invention relates broadly to the art of metal working, and more particularly to the art as applicable to the welding of metal to form pipes, tubes and the like, although the utility of the invention is not limited either with respect to the particular apparatus utilized as the forming means, or the particular articles being formed thereby. In the following description therefore as applied to the welding of tubular articles, it is to be understood that the showing and definition of the respective parts are for purposes of illustration only.

In the welding of pipes and tubes it is often desirable to effect a metal thickening operation at the seam either for the purpose of affording better abutting engagement between the edges being welded, or for the purpose of actually thickening the metal at the seam to thereby strengthen the seam and over-compensate for any slight defects along the weld, such as creep in occasionally even with the best of welds. In effecting such a thickening operation, it has been customary to force the metal, which has just been welded to form the seam, tightly together, or squeeze the same, the metal being at such a temperature at this time that it will be thickened at the desired point.

In actual practice it has been found very frequently that the seam in the article being welded does not come through the welding machine in exactly the desired predetermined line, in which case the seam thickening means may function at one side or the other of the actual welded joint. As a result, the metal adjacent the seam is thickened but the seam itself is substantially unaffected. Many attempts have been made to thicken the seam as it is welded, by using grooved rolls straddling the seam. Because of the presence of the groove in the welding roll, the edges of the seam are not positively alined at the instant of welding. If the hot edges of the seam are not square but inclined, as frequently happens in practice, the application of welding pressure thereto is apt to overlap the edges unless they are positively maintained in perfect alinement. In accordance with the present invention, the edges to be welded are confined in precision alinement at the instant of welding and the thickening of the seam is effected after the weld is complete but while it remains at a suitable working temperature.

The present invention has for one of its objects the provision of a method and apparatus which will be automatically effective for insuring a metal thickening operation at exactly the desired point. To this end the invention preferably contemplates a movement of the thickening mechanism with respect to the article being welded, whereby a predetermined relationship may be always automatically maintained between the two.

In the illustrated embodiment of the invention I have shown the same as applied to an article forming mechanism in which a roll stand is provided for effecting the seam thickening operation. In such case, the invention contemplates the provision of means for effecting a sufficient rotation of the roll stand so as to maintain the rolls in such a relationship to the tube as to insure application of the thickening pressure at exactly the seam line.

Another object of the present invention is to provide a control mechanism of the general character referred to which is automatically operated in response to light and heat conditions, and especially the light and heat of the metal at the joint. In this manner the mechanism is effective for maintaining the thickening roll stand in predetermined central relationship to the hottest zone of the article, this zone being the portion containing the seam itself.

In the accompanying drawings there is shown for purposes of illustration only, a preferred embodiment of the present invention. In the drawings:

Figure 1 is a partial transverse sectional view through a welded article illustrating one type of thickened seam;

Figure 2 is a view similar to Figure 1, illustrating a slightly different type of thickened seam;

Figure 3 is a view similar to Figures 1 and 2, illustrating still another characteristic seam;

Figure 4 is a side elevational view of one form of apparatus utilized in accordance with the present invention;

Figure 6 is a diagrammatic view of the apparatus and a control means therefor.

Figure 5:
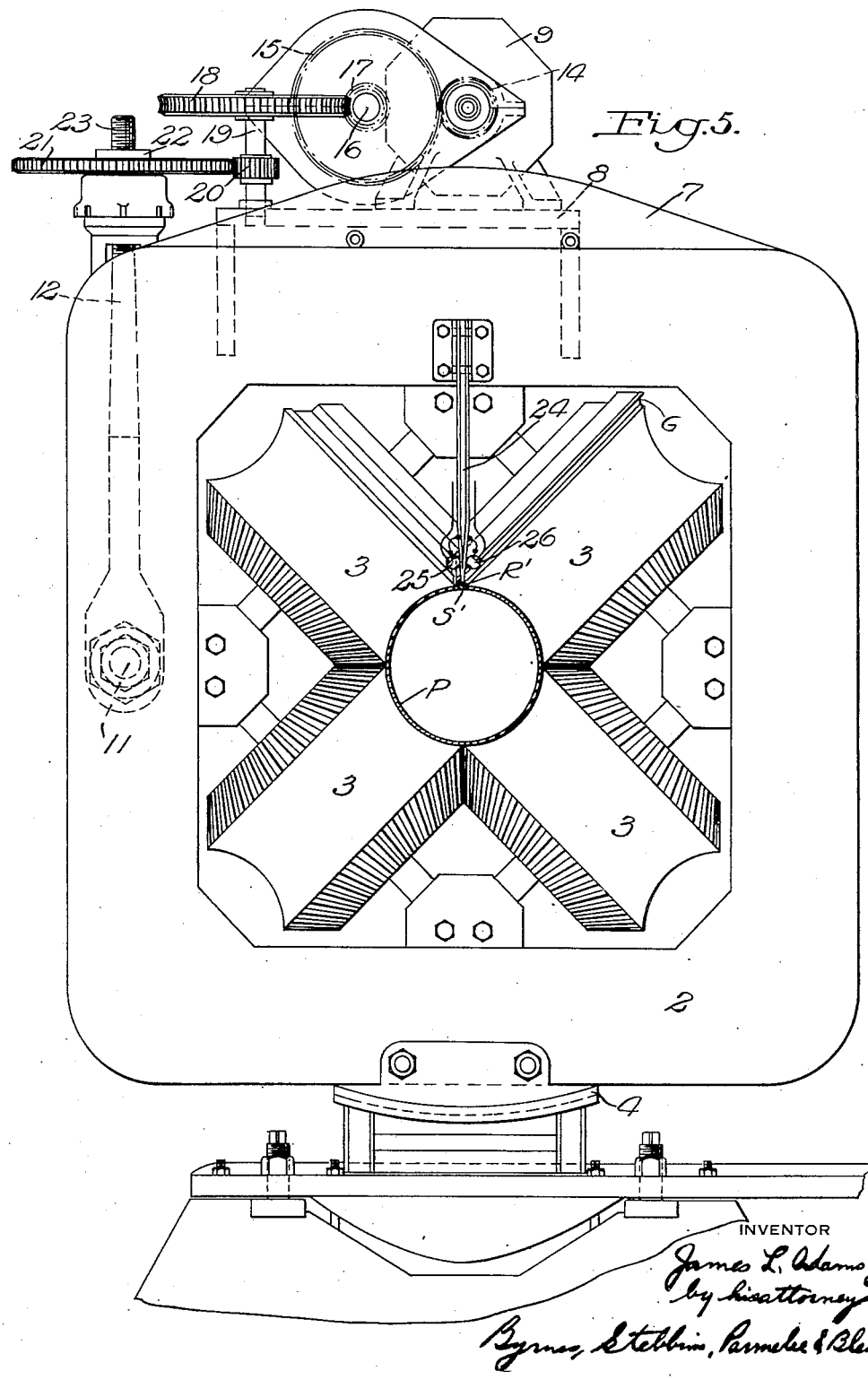
Figure 5 is a front elevational view of the apparatus illustrated in Figure 4.

Having reference more particularly to Figure 1 of the drawings, there is illustrated a seam S formed between the edges E of a strip of metal or piece of plate preformed in such manner as to bring the adjacent edges into the desired abutting relationship. In this form of the invention the metal adjacent the seam S is shown as thickened to provide an inwardly projecting rib or bead R.

In the embodiment illustrated in Figure 2, the rib R', symmetrically disposed with respect to the seam S', is illustrated as being outwardly projecting, while in Figure 3 the two ribs R'' are shown as being symmetrically disposed with respect to the seam S'' and as being uniformly formed both on the interior and exterior of the article. These figures are illustrative only and show the result which it is desired to obtain where a seam thickening operation is resorted to.

In Figures 4, 5 and 6 there is illustrated a form of apparatus adapted to produce thickening of a welded joint of the character illustrated more particularly in Figure 2 of the drawings, and in which the bead or rib R' projects outwardly from the surface of the article. For purpose of understanding the present invention, it may be assumed that a pipe P, as illustrated in Figure 4, has just immediately before been welded in a suitable welding apparatus, and that with the seam still at a bright red heat it is travelling forwardly in the direction illustrated by the arrow A. During its forward travel it passes through a stand 2 located closely adjacent the welder containing a series of rolls 3 of any desired construction. The rolls are herein illustrated as being intergeared for simultaneous rotation when driven in any desired manner (not shown). The rotation of the rolls will not only assist in a forward feeding movement of the pipe P, but will be effective for exerting a squeezing action thereon, it being understood that the diameter of the pass provided by the rolls is slightly less than the entering diameter of the welded pipe.

As will be apparent more particularly from Figure 5 of the drawings, the rolls are of such construction as to provide a peripherally extending confining surface which is effective throughout the entire area of the pipe with the exception of that adjacent the seam S', where one of the rolls 3 is so located as to overlap the seam, and is provided with a groove G of the desired surface contour to develop a thickened bead at the seam line.

It is contemplated that the pipe will leave the welding apparatus in such manner that the seam will travel exactly midway of the groove G in the upper roll 3, whereby the thickened weld will be disposed exactly in the center of the projecting bead. In actual practice, however, it has been found that frequently the pipe tends to twist or rotate in such manner that the seam is off center with respect to the groove G in the roll 3, and in such case the roll stand produces a thickening operation on the parent metal at one side or the other of the seam itself, the metal at the seam being left in its original state. This may occur in spite of the most accurate centering of the seam prior to welding. Such result is useless as it does not strengthen the weld, whereas my invention insures proper alinement of the thickened portion and the welded seam.

As will be apparent from the drawings, the stand 2 is illustrated as carrying a track 4 of arcuate contour concentric with the axis of the pass of the rolls 3. This track is mounted on an endless line of balls 5 which are adapted to circulate through return tubes or passages 6 into supporting position with respect to the track whereby to maintain at all times a roller support for the track 4.

Adjacent the stand 2 is a stationary mounted plate 7 having projecting therefrom a bracket 8 on which is mounted a reversible motor 9. The plate 7 is formed with a slot 10 through which projects a bolt 11 secured to the frame 2 at one end and to a connecting rod 12 at the opposite end. By reason of this construction, it will be apparent that if the connecting rod is moved upwardly, the roll stand 2 will be caused to rotate in a clockwise direction, while if it is moved downwardly, the roll stand will be caused to rotate in a counter-clockwise direction, the rotation being relative to the pipe P or to the article within the roll pass.

The reversible motor 9 constitutes an actuating means for the connecting rod 12 for effecting movement thereof in one direction or the other. By reference more particularly to Figure 5 of the drawings, it will be noted that the armature shaft of the motor 9 carries a pinion 14 which meshes with a gear 15 secured to and driving a shaft 16, on which is secured a worm 17. The worm meshes with and drives a worm wheel 18 secured to a short vertically extending shaft 19 carrying a pinion 20 which is in driving engagement with a gear 21. The gear 21 has an internally threaded hub 22 carried by the upper threaded end 23 of the connecting rod 12. Thus, when the motor is driven in one direction it will be effective for so rotating the gear 21 as to move the connecting rod upwardly, while when rotated in the opposite direction it will effect a downward movement of the connecting rod, the hub 22 of gear 21 being held between end thrust means of suitable construction.

In accordance with the present invention, the direction of rotation of the motor is controlled automatically by the position of the seam S'. With the apparatus functioning as intended, the seam S' will be disposed centrally within the frame 2 and exactly on the median plane of groove G. Lying in this plane is a seam plate 24 which projects downwardly to a position almost in engagement with the pipe. Supported by the seam plate and lying on opposite sides thereof are light and heat sensitive units 25 and 26 respectively, these units preferably being in the nature of photoelectric cells shielded throughout all portions thereof except those portions which face downwardly toward the pipe. By reason of the fact that the photo-electric or light sensitive units are symmetrically disposed on opposite sides of the seam plate 24, it will be apparent that with the seam lying in the vertical median plane directly under the seam plate, the two light sensitive units will be uniformly subjected to light and heat and will therefore be uniformly resistant or conductive to an electric current. Should the seam tend however, to shift in one direction or the other, the light and heat thereof will not be uniformly received by the control units, and one unit will become more highly conductive than the other. It is this condition which is relied upon to maintain the parts in the desired cooperative relationship to the material being operated upon, a very slight shifting of the hot seam giving a great unbalance effect on the sensitive cells.

In Figure 6 there is illustrated diagrammatically an electric control system comprising a line wire L and a line wire L' leading from any desired source of current (not shown), and controlled by a double pole single throw switch 27. With the switch in closed position, current will flow from the line wire L to the wire l and thence through branch wire 28 to a series field coil 29 for the motor 9. The opposite side of the series field coil has a connection 30 to a bridge wire 31 leading at its opposite ends to contacts 32 and 33 respectively. The wire l is illustrated as being grounded at 34 to the seam plate 24. This and other grounded connections are shown in order to simplify the wiring diagram, it being understood that in actual constructions the grounds are usually replaced by return lines properly insulated.

With the switch in the position described, current will flow from the line wire L' to the wire l' and thence to bridge wire 35 having contacts 36 and 37 respectively. Intermediate the bridge wires 31 and 35, are bridge wires 38 and 39 operatively connected to contacts 40 and 41 respectively at one end and to contacts 43 and 42 respectively at the opposite end. The bridge wire 38 is illustrated as having a connection 44 to the motor brush 45, while the bridge wire 39 is illustrated as having a connection 46 with the motor brush 47. Adapted to cooperate with the contacts 32 and 40 is an insulated bridging contactor 48, a similar contactor 48' being provided for bridging the contacts 36 and 41. The contactors 48 and 48' are carried by one end of a cross interlocking bar 49 having a pivotal mounting 50. The opposite end of the cross interlocking bar carries a bridging conductor 51 for the contacts 33 and 42, and a second bridging conductor 52 for the contacts 37 and 43. The cross interlocking bar 49 is normally urged into a neutral position by a center return spring 53.

Carried by one end of the interlocking bar is an armature 54, a similar armature 55 being secured to the opposite end of the bar. These armatures are adapted to be attracted by U shaped magnets 56 and 57 respectively. The magnet 56 is illustrated as having an energizing coil 58, while the magnet 57 has a similar energizing coil 59. With the parts in the position illustrated in Figure 6, it is assumed that the coil 59 is energized and the coil 58 de-energized, thus swinging the interlocking bar 49 in a clockwise direction about its pivotal mounting 50 to bring the bridging contactors 48 and 48' into the position shown. In this position current will flow from the wire l through the series field coil to the wire 30 and thence to bridge wire 31 and contact 32. From contact 32 it will flow through the bridging contactor 48 to contact 40 and thus to connection 44 and brush 45. From brush 47 the current flows through connection 46 to bridge wire 39 and thence by way of contact 41 to bridging contactor 48', contact 36 and bridge wire 35 to wire l', thus completing the circuit with a current flow to the motor in the direction indicated by the arrows in Figure 6.

For energizing the magnetizing coil 59, there is shown a contactor 60 cooperating with a grounded contact 61 and an insulated contact 62 connected by wire 63 to one terminal of the coil 59, the opposite terminal being connected by wire 64, wire 65 and wire 66 to wire l'. The contactor 60 is carried by a core 67 movable within a solenoid winding 68 having one terminal connected to a contact 76 and the opposite terminal connected to wire l' through wires 65 and 66.

For energizing the solenoid winding 68 there is provided a very sensitive damped double throw balanced relay 70. This relay is normally held in a desired neutral position by an extremely light spring 71 the neutral position of which may be adjusted by a screw 72. The movement of the relay is damped in any desired manner as by an air dash-pot or equivalent means 73. Connected to the upper part of the core is a light double throw relay contact disc 74 movable between an upper pair of contacts 75 and 76, wherein the contact 75 is grounded, and a lower pair of contacts 69 and 77 wherein the contact 77 is grounded. In Figure 6 the switch contact disc 74 is shown as bridging the contacts 75—76, thus causing a current flow from grounded wire l to contact 75, thence through the contact disc 74 to contact 76, through coil 68 and wires 65 and 66 to wire l', thus energizing coil 68 and causing it to move the contactor 60 into bridging position with respect to the contacts 61 and 62 for energizing the magnet coil 59 and swinging the interlocking bar to the position shown.

This movement of the damped double throw balanced relay is effected by a relay coil 78 having the terminal 79 thereof connected to wire l' through wire 66 and having the opposite terminal connected by wire 80 to the photo-electric cell unit 25 and through the unit to the ground. Rotation of the pipe P in a counter-clockwise direction as illustrated in Figure 6 will subject unit 25 to an excessive amount of light, thus energizing relay coil 78 to move the parts into the position shown for effecting rotation of the motor 9 in such direction as to cause an upward movement of the connecting rod 12.

Should the pipe P, however, happen to rotate in the opposite direction, the unit 26 will receive a greater light quantity and will be effective through wire 81 for energizing relay coil 82 the opposite terminal 83 of which is connected to wire l'. With the relay coil 82 preponderantly energized, as compared to coil 78, the relay core 70 will move downwardly, thus bringing the disc 74 into position to bridge the contacts 77 and 69. In such position the magnet coil 59 will be de-energized, and current will flow from wire l through the ground to contact 77 and thence by way of disc 74 to contact 69 to solenoid coil 84. The opposite terminal 85 of the solenoid coil is connected to wire l'. The solenoid coil 84 will thus be energized to move the contactor 86 into position to bridge contacts 87 and 88. Current will then flow from grounded contact 87 through contactor 86 to contact 88, and then through wire 89 to magnet coil 58 and through the magnet coil to wire l'. This will energize the magnet coil 58 and cause the interlocking bar 49 to rotate in a counter-clockwise direction to bring the insulated bridging contactor 51 into engagement with the contacts 33—42 and the bridging contactor 52 into engagement with the contacts 37—43. With the parts in this position the current flow through the motor armature will be reversed, thus causing the motor to rotate in the opposite direction and produce a corrective movement of the frame 2 in the opposite direction.

From the foregoing description it will be apparent that I have provided a control system which is automatically effective for always maintaining the material operating means, herein shown as comprising the rolls 3, in the proper cooperative relation to the material being operated upon, regardless of whether the seam in such material travels through the desired location in space peripherally of the tube and in the roll pass or not.

It is to be understood that the control system herein illustrated is a typical form of control system and is not to be construed in a limiting sense. It will likewise be understood that while I have herein referred to a seam thickening stand operative after the actual welding, the invention is equally applicable to a welding stand wherein the weld is initially effected. With a welding stand, the heated edges of the material, either just before or after welding, may be utilized for effecting a corrective movement of the material working mechanism. The use of a thickening roll stand operative subsequent to the actual welding involves certain very definite advantages, as already explained in detail.

The utilization of an anti-friction mounting for the entire roll-stand mechanism insures easy movement thereof, and permits a sufficiently rapid movement to effect the desired correction.

Further advantages of the present invention arise from the provision of a method and apparatus wherein means is provided for automatically effecting a corrective adjustment of the entire roll-stand mechanism relative to the seam in the material on which it operates, whereby a proper operating relationship is maintained at all times.

Still other important advantages accrue from my provision of means for carrying out the initial welding under full guiding inside and out of the blank, to obviate overlapping of the seam edges, together with my provision for later thickening the seam, after the weld has set, but while it is still very hot.

While I have herein illustrated and described a preferred embodiment of the invention, it will be understood that changes in the construction and arrangement of the parts may be made without departing either from the spirit of the invention or the scope of my broader claims.

I claim:

1. In a metal welding apparatus, means for operating upon material to be welded to form a seam therein, and light responsive means for effecting a corrective movement of the operating means to maintain a predetermined relationship between the seam in said material and the operating means.

2. In a welding apparatus, the combination with means for progressively forming a seam between heated, abutting, metallic edges, and means supporting said seam-forming means for lateral adjustment, of means responsive to a departure of the formed seam from a predetermined position relative to the forming means, effective to adjust the forming means laterally to restore such predetermined relation of the seam and forming means.

3. The combination of claim 2 wherein said seam-forming means comprises a roll pass shaped to form a rib disposed centrally of the seam between said edges.

4. A metal working apparatus comprising grooved means for thickening a welded seam, thermally sensitive means responsive to the radiant energy from said seam, means for shifting said grooved means transversely of the seam, and means controlled by said thermally sensitive means for actuating the shifting means.

5. In a metal working apparatus, roll means for thickening a seam in the metal, and light responsive means for effecting a corrective movement of the roll seam thickening means in accordance with the position of the seam.

6. In a metal welding apparatus, a roll pass for thickening a welded seam, a seam plate substantially perpendicular to the metal and alined substantially in a plane containing said seam, and means responsive to radiant energy disposed on opposite sides of the seam plate for effecting a corrective movement of the roll pass in accordance with the line of travel of the seam.

7. In a metal working apparatus, a roll pass for effecting pressure on material being worked to form a thickened seam, means supporting the roll pass for rotary adjustment, and means for effecting a movement of the roll pass about the pass axis to maintain a predetermined relationship between the pass and the material, said means being responsive to a departure of the seam from a given position.

8. In a metal welding apparatus, means for performing an operation on a welded seam, and means controlled by the position of the seam relative to the first-mentioned means for effecting a corrective movement of the first mentioned means.

9. In a metal working apparatus, means for compressive working of a welded seam between adjacent heated edges, light responsive means symmetrically disposed with respect to the normal position of said edges, and means controlled by said light responsive means for effecting a corrective movement of the seam working means in the event of seam displacement.

10. In a method of forming seams between heated metallic edges, the steps including subjecting the edges to pressure, and shifting the zone of pressure application in accordance with the departure of the seam being formed from a given line.

11. In a metal rolling apparatus, hot metal thickening means, thermally sensitive corrective means responsive to a narrow maximum temperature zone along the thickened metal, and power-driven means responsive to said last mentioned means for correcting the position of the thickening means.

12. In a hot metal bead forming apparatus, bead forming rolls, thermally sensitive means responsive to the position of a narrow maximum temperature zone in said bead, and means responsive to said thermally sensitive means for shifting said rolls in a direction transversely of the longitudinal axis of the bead.

13. In a metal compressing apparatus, rolls for forming a thickened seam, means supporting said rolls for lateral adjustment thermally-sensitive, seam-position control means, and means responsive to said thermally sensitive means for shifting the rolls transversely of the seam.

14. In a method of progressively compressing a narrow zone of hot metal, the steps including comparing the temperatures of parts of said zone, and moving the zone of pressure application in accordance with said temperatures.

15. In a method of forming tubes, the steps comprising feeding a blank having heated edges in a direction substantially parallel to its longitudinal axis, applying pressure to the blank during such movement to form a thickened seam between said heated edges, comparing the radiant energy emanating from said heated edges and shifting the zone of seam thickening in accordance with said comparison.

16. In a method of forming tubes, the steps comprising bringing the heated edges of a substantially tubular blank into contact to form a seam, applying sufficient pressure to thicken the hot seam without material alteration of the thickness of the main body of the metal, and so moving the zone of pressure application as to center the zone of thickening between said edges in accordance with the temperatures of the edges adjacent said zone.

17. In a metal seam-working apparatus, roll-type thickened-seam forming means, said means being mounted on a transverse-to-seam power-shifting mechanism, thermally-sensitive means responsive to progressive deviations transversely to its length of the hotter elements of said seam, said deviations being substantially in the plane of the material, and electric means co-ordinating the said thermally-sensitive means with operating elements of said power-shifting mechanism and including means for maintaining the seam-thickening means in substantial instantaneous alinement with said hotter elements of the seam.

18. In a hot welded-seam working apparatus, a heated-seam thickening roll-pass mounted on a transverse-to-seam power-shifting mechanism, said roll-pass including a seam rib-forming means symmetrically disposed with respect to normal mid-line of said seam, and automatic thermally-responsive means connected operatively with said power-shifting mechanism and located immediately adjacent the said seam, and providing included means to maintain the rib symmetry with respect to the hottest elements of the seam as the latter deviate from normal mid-line position.

19. In a welded-seam hot-working apparatus, a hot-seam thickening roll-pass, including rib-forming means symmetrically disposable with relation to the most highly heated elements of said hot-seam, a transverse-to-seam power-shifting apparatus operatively connected with said roll-pass and said rib-forming means, and thermally-responsive means connected operatively with said last-mentioned means and applied to detect and follow any transverse deviations from normal position of said most highly heated elements.

20. In a hot welded-seam working apparatus, a seam-thickening roll-pass applicable after completion of the welding process, a power-shifting means mounting said roll-pass, and including transverse-to-seam shifting elements therefor, and a progressively effective thermally-responsive means connected to control the instantaneous positions taken by said roll-pass and its included seam thickening device.

21. In a hot-seam working apparatus, seam-engaging and seam-thickening means, power-shift means operatively connected to said seam-thickening means, and thermally-sensitive detecting means applied closely adjacent to said hot-seam, and operatively connected to control said power-shift means and said seam-thickening means progressively and instantaneously to maintain the momentary alinement thereof with the most highly heated elements of said hot-seam.

JAMES L. ADAMS, Jr.